(12) United States Patent
Shi

(10) Patent No.: US 12,306,786 B2
(45) Date of Patent: May 20, 2025

(54) COMMUNICATION LINK SWITCHING CONTROL CIRCUIT, COMMUNICATION LINK AND SERVER

(71) Applicant: SUZHOU METABRAIN INTELLIGENT TECHNOLOGY CO., LTD., Jiangsu (CN)

(72) Inventor: Bo Shi, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/724,628

(22) PCT Filed: Apr. 28, 2023

(86) PCT No.: PCT/CN2023/091425
§ 371 (c)(1),
(2) Date: Jun. 27, 2024

(87) PCT Pub. No.: WO2023/208161
PCT Pub. Date: Nov. 2, 2023

(65) Prior Publication Data
US 2024/0419624 A1    Dec. 19, 2024

(30) Foreign Application Priority Data

Apr. 28, 2022  (CN) .......................... 202210460960.0

(51) Int. Cl.
*G06F 13/42* (2006.01)

(52) U.S. Cl.
CPC .. *G06F 13/4282* (2013.01); *G06F 2213/0016* (2013.01)

(58) Field of Classification Search
None
See application file for complete search history.

(56) References Cited

U.S. PATENT DOCUMENTS 6,157,955 A * 12/2000 Narad ................. H04L 49/9031
                                                709/228
9,294,386 B2 * 3/2016 Narad .................... G06F 9/3885
(Continued)

FOREIGN PATENT DOCUMENTS

CN         1333964 A      1/2002
CN       108170617 A      6/2018
(Continued)

*Primary Examiner* — Henry Tsai
*Assistant Examiner* — Christopher A Bartels
(74) *Attorney, Agent, or Firm* — IPro, PLLC

(57) ABSTRACT

A controlling circuit includes a plurality of analogue switches and a controlling module. The controlling module is configured for, when the current master device of the serial bus is the I3C master device, controlling the analogue switches corresponding to I3C slave devices that are selected by the user to be switched on, whereby the serial bus ensures the data interaction between the I3C master device and the I3C slave devices, and when the current master device of the serial bus is the SMBUS master device, controlling the analogue switches corresponding to SMBUS slave devices that are selected by the user to be switched on, whereby the serial bus ensures the data interaction between the SMBUS master device and the SMBUS slave devices.

17 Claims, 2 Drawing Sheets

(56) References Cited

U.S. PATENT DOCUMENTS

| | | | | |
|---|---|---|---|---|
| 9,965,442 B2* | 5/2018 | Borland | .............. | G06F 13/4068 |
| 10,212,658 B2* | 2/2019 | Pelletier | ............ | H04W 52/0212 |
| 12,198,774 B2* | 1/2025 | Alzheimer | ........... | G11C 7/1069 |
| 2005/0259496 A1* | 11/2005 | Hsu | ........................ | G06F 13/16 |
| | | | | 365/226 |
| 2018/0083800 A1* | 3/2018 | McVay | .................... | H04L 12/52 |
| 2018/0189221 A1* | 7/2018 | Morning-Smith | .......................... | |
| | | | | G06F 13/4282 |
| 2018/0225230 A1* | 8/2018 | Litichever | ................ | G06F 21/82 |
| 2018/0225251 A1* | 8/2018 | Sthoeger | ............. | G06F 13/4291 |
| 2018/0260357 A1* | 9/2018 | Amon | ................... | G06F 13/404 |
| 2019/0129880 A1* | 5/2019 | Zhu | ..................... | G06F 13/4282 |
| 2019/0356412 A1* | 11/2019 | Pitigoi-Aron | ....... | G06F 13/4282 |
| 2021/0006344 A1* | 1/2021 | Chen | ........................ | G01S 19/14 |
| 2021/0067385 A1* | 3/2021 | Finn | .................... | H04L 25/0272 |
| 2021/0271619 A1* | 9/2021 | Bhavsar | .............. | G06F 13/4291 |
| 2021/0318981 A1* | 10/2021 | Jurski | ................. | G06F 13/4282 |
| 2022/0158865 A1* | 5/2022 | Thomaiyar | ....... | H04L 12/40039 |
| 2023/0103368 A1* | 4/2023 | Vergis | ................. | G06F 13/1668 |
| | | | | 711/154 |
| 2023/0229606 A1* | 7/2023 | Vergis | ................. | G06F 13/4282 |
| | | | | 710/52 |
| 2023/0305922 A1* | 9/2023 | Frey | .................... | G06F 11/0793 |
| 2023/0394160 A1* | 12/2023 | Patel | ........................ | G06F 21/33 |
| 2024/0281401 A1* | 8/2024 | Mishra | ................ | G06F 13/4291 |

FOREIGN PATENT DOCUMENTS

| | | |
|---|---|---|
| CN | 108255754 A | 7/2018 |
| CN | 108885602 A | 11/2018 |
| CN | 109783416 A | 5/2019 |
| CN | 213751063 U | 7/2021 |
| CN | 114780462 A | 7/2022 |

* cited by examiner

COMMUNICATION LINK SWITCHING CONTROL CIRCUIT, COMMUNICATION LINK AND SERVER

CROSS REFERENCE TO RELEVANT APPLICATIONS

The present application claims the priority of the Chinese patent application filed on Apr. 28, 2022 before the Chinese Patent Office with the application number of 202210460960.0 and the title of "COMMUNICATION LINK SWITCHING CONTROL CIRCUIT, COMMUNICATION LINK AND SERVER", which is incorporated herein in its entirety by reference.

FIELD

The present application relates to the technical field of data communication, and particularly relates to a controlling circuit for communication-link switching, a communication link and a server.

BACKGROUND

With the expansion and upgradation of server system architectures, the types and the usage environments of the system board cards are increasingly more complicated, and they involve increasingly more hierarchies of topological communication links. Therefore, the slave devices that are required to be deployed are growing exponentially. However, in the related art, the servers usually use SMBUS (System Management Bus) to perform the data interaction between the master device and the slave devices. However, as restricted by the communication logic of the SMBUS itself and the protocol, the communication speed of SMBUS is merely between 10 KHz and 100 KHz. In order to satisfy the new demands of the device development, the I3C (Improved Inter Integrated Circuit) bus is gradually replacing SMBUS to serve as a protocol that has a higher communication speed in servers for the data transmission. However, inevitably, there still exist some devices that may perform data transmission merely via SMBUS. Therefore, how to provide a communication link that is compatible with SMBUS and the I3C bus is a problem required to be solved urgently by a person skilled in the art.

SUMMARY

An object of the present application is to provide a controlling circuit for communication-link switching, a communication link and a server, in which the serial bus is compatible with the I3C bus and SMBUS, which ensures the demands on data transmission of multiple types of devices.

In order to solve the above technical problem, the present application provides a controlling circuit for communication-link switching, the controlling circuit is applied to a communication link, and the communication link includes a serial bus, an I3C master device, a plurality of I3C slave devices, an SMBUS master device and a plurality of SMBUS slave devices; and the controlling circuit includes:
- a plurality of analogue switches that are provided in the serial bus and are connected to the I3C slave devices and the SMBUS slave devices correspondingly one to one; and
- a controlling module having an input terminal connected to the serial bus and an output terminal connected to the analogue switches, where the controlling module configured for, when a master device of the serial bus is the I3C master device, controlling the analogue switches corresponding to I3C slave devices that are selected by a user to be switched on, so that the I3C master device and the I3C slave devices that are selected by the user perform data interaction via the serial bus; and when the master device of the serial bus is the SMBUS master device, controlling the analogue switches corresponding to SMBUS slave devices that are selected by the user to be switched on, so that the SMBUS master device and the SMBUS slave devices that are selected by the user perform data interaction via the serial bus.

In some embodiments of the present application, the controlling module is further configured for collecting data information of the serial bus, and determining a master-device type of the serial bus, the master-device type of the serial bus includes the I3C master device and the SMBUS master device.

In some embodiments of the present application, the serial bus includes a serial data line and a serial clock line;
- the serial data line is configured for transmitting serial data when the I3C master device and the I3C slave devices that are selected by the user are communicating or transmitting serial data when the SMBUS master device and the SMBUS slave devices that are selected by the user are communicating; and
- the serial clock line is configured for transmitting a clock signal sent by the I3C master device to the I3C slave devices that are selected by users or transmitting a clock signal sent by the SMBUS master device to the SMBUS slave devices that are selected by users.

In some embodiments of the present application, the I3C slave devices are further configured for, based on setting by the user, as a temporary I3C master device, sending a clock signal to the serial clock line; and
- the I3C master device is further configured for, when the user sets the temporary I3C master device, as a temporary I3C slave device, performing data interaction of the serial data via the serial data line with the temporary I3C master device and the I3C slave devices that are selected by the user, and receiving, via the serial clock line, the clock signal sent by the temporary I3C master device.

In some embodiments of the present application, the controlling module is a complex programmable logic device (CPLD).

In some embodiments of the present application, the SMBUS master device and the SMBUS slave devices are connected by an interrupted-communication line; and
- the SMBUS master device is further configured for, when an interruption prompting message sent by the SMBUS slave devices via the interrupted-communication line is received, processing the interruption prompting message.

In some embodiments of the present application, the I3C master device is further configured for, when an interruption prompting message sent by the I3C slave devices via the serial bus is received, performing soft interruption processing on the interruption prompting message.

In some embodiments of the present application, the soft interruption processing includes invoking an interrupting module, and processing the interruption prompting message with delay.

In some embodiments of the present application, the I3C master device and the I3C slave devices are a master device and slave devices that perform data interaction by using an I3C protocol.

In some embodiments of the present application, the SMBUS master device and the SMBUS slave devices are a master device and slave devices that perform data interaction by using an SMBUS protocol.

In some embodiments of the present application, the controlling module is configured for, when the master device of the serial bus is one of the I3C slave devices, performing data interaction between the I3C slave devices.

In some embodiments of the present application, the plurality of SMBUS slave devices perform data interaction therebetween.

In some embodiments of the present application, the controlling module controls the analogue switches to be switched on and switched off by using EN terminals of the analogue switches.

In some embodiments of the present application, the I3C slave devices and the SMBUS slave devices perform bidirectional transmission of serial data by using the analogue switches.

In some embodiments of the present application, a data transmission speed of the I3C protocol is greater than a data transmission speed of the SMBUS.

In some embodiments of the present application, the I3C slave devices and the analogue switches are connected via an I3C HUB.

In some embodiments of the present application, the SMBUS slave device and the analogue switches are connected via an SMBUS MUX.

In order to solve the above technical problem, the present application provides a communication link, the communication link includes the controlling circuit for communication-link switching stated above.

In some embodiments of the present application, the communication link further includes a serial bus, an I3C master device, a plurality of I3C slave devices, an SMBUS master device and a plurality of SMBUS slave devices.

In order to solve the above technical problem, the present application provides a server, the server includes the communication link stated above.

The present application discloses a controlling circuit for communication-link switching, a communication link and a server, which relates to the field of data communication, and is used for switching data interaction links. The controlling circuit includes a plurality of analogue switches and a controlling module. The controlling module is configured for, when the current master device of the serial bus is the I3C master device, controlling the analogue switches corresponding to the I3C slave devices that are selected by the user to be switched on, whereby the serial bus ensures the data interaction between the I3C master device and the I3C slave devices, and the speed of the data transmission in the serial bus is increased, and when the current master device of the serial bus is the SMBUS master device, controlling the analogue switches corresponding to the SMBUS slave devices that are selected by the user to be switched on, whereby the serial bus ensures the data interaction between the SMBUS master device and the SMBUS slave devices. It can be seen that the serial bus according to the present application is compatible with the I3C bus and SMBUS, which ensures the demands on data transmission of multiple types of devices.

BRIEF DESCRIPTION OF THE DRAWINGS

In order to more clearly illustrate the technical solutions of the embodiments of the present application, the figures that are required to describe the related art and the embodiments will be briefly described below. Apparently, the figures that are described below are merely embodiments of the present application, and a person skilled in the art may obtain other figures according to these figures without paying creative work.

DETAILED DESCRIPTION

The core of the present application is to provide a controlling circuit for communication-link switching, a communication link and a server, in which the serial bus is compatible with the I3C bus and SMBUS, which ensures the demands on data transmission of multiple types of devices.

In order to make the objects, the technical solutions and the advantages of the embodiments of the present application clearer, the technical solutions according to the embodiments of the present application will be clearly and completely described below with reference to the drawings according to the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

Figure 1:
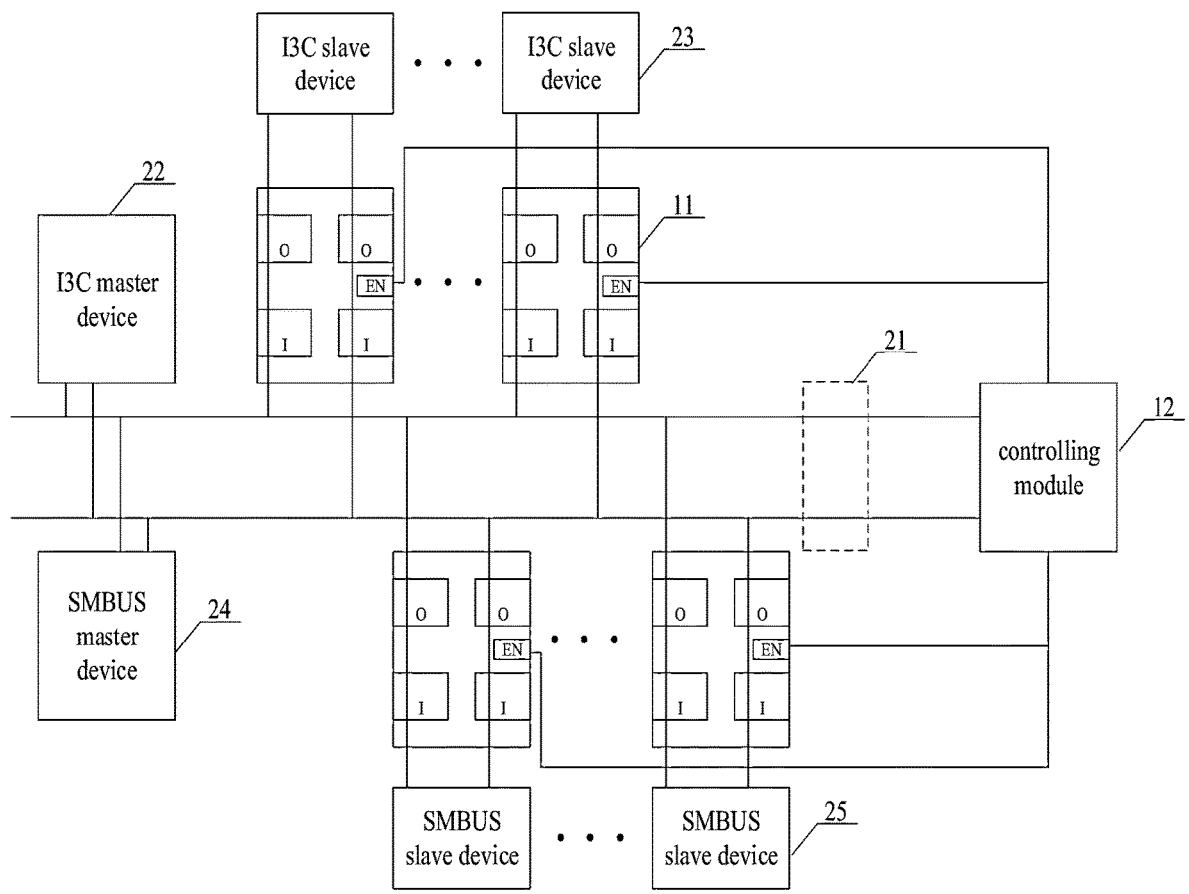
FIG. 1 is a schematic structural diagram of a controlling circuit for communication-link switching according to some embodiments of the present application.

Referring to FIG. 1, FIG. 1 is a schematic structural diagram of a controlling circuit for communication-link switching according to some embodiments of the present application. The controlling circuit is applied to a communication link, and the communication link includes a serial bus 21, an I3C master device 22, a plurality of I3C slave devices 23, an SMBUS master device 24 and a plurality of SMBUS slave devices 25. The controlling circuit includes:

a plurality of analogue switches 11 that are provided in the serial bus 21 and are connected to the I3C slave devices 23 and the SMBUS slave devices 25 correspondingly one to one; and a controlling module 12 having an input terminal connected to the serial bus 21 and an output terminal connected to the analogue switches 11, where the controlling module 12 is configured for, when the master device of the serial bus 21 is the I3C master device 22, controlling the analogue switches 11 corresponding to the I3C slave devices 23 that are selected by a user to be switched on, whereby the I3C master device 22 and the I3C slave devices 23 that are selected by the user perform data interaction via the serial bus 21; and when the master device of the serial bus 21 is the SMBUS master device 24, controlling the analogue switches 11 corresponding to the SMBUS slave devices 25 that are selected by the user to be switched on, whereby the SMBUS master device 24 and the SMBUS slave devices 25 that are selected by the user perform data interaction via the serial bus 21.

Given that the servers in the related art usually use SMBUS to perform data interaction, the master device of the serial bus 21 is the SMBUS master device 24, and the slave devices of the serial bus 21 are the SMBUS slave devices 25. However, the communication logic of SMBUS itself decides that the communication speed of SMBUS is restricted between 10 KHZ and 100 KHz. It can be seen that SMBUS has a low communication speed, which cannot satisfy the demand on high-speed information transmission by users.

In order to solve the above technical problem, in the present application, a plurality of analogue switches 11 are provided in the serial bus 21, and each of the analogue switches 11 is connected to one of the I3C slave devices 23 or one of the SMBUS slave devices 25. When the user sets that the current master device of the serial bus 21 is the I3C master device 22, and selected a plurality of I3C slave devices 23 to be added into the data interaction, the controlling module 12 switches on the analogue switches 11 corresponding to the plurality of I3C slave devices 23 that are selected by the user, whereby the I3C master device 22 and the selected I3C slave devices 23 perform data interaction via the serial bus 21. Moreover, when the user sets that the current master device of the serial bus 21 is the SMBUS master device 24, and selected a plurality of SMBUS slave devices 25 to be added into the data interaction, the controlling module 12 switches on the analogue switches 11 corresponding to the plurality of SMBUS slave devices 25 that are selected by the user, whereby the SMBUS master device 24 and the selected SMBUS slave devices 25 perform data interaction via the serial bus 21. It can be seen that, in the present application, not only the data interaction using the I3C protocol is realized to increase the data transmission speed, but also the traditional master device and slave devices are compatible, i.e., the SMBUS master device 24 and the SMBUS slave devices 25, whereby the SMBUS master device 24 and the SMBUS slave devices 25 may also perform data interaction via the serial bus 21.

It should be noted that the I3C protocol may ensure that the data transmission speed reaches 12.5 M, to ensure a high data transmission speed.

It can be seen that, in the present application, by providing the analogue switches 11, the serial bus 21 cannot only enable the I3C master device 22 and the I3C slave devices 23 to perform data interaction, but also can enable the SMBUS master device 24 and the SMBUS slave devices 25 to perform data interaction. Because the I3C protocol has a higher transmission speed, the user may set the master device and the slave devices that require higher transmission speeds to be the I3C master device 22 and the I3C slave devices 23. Moreover, the master device that is set to be the SMBUS master device 24 and the slave devices that is set to be the SMBUS slave devices 25 are not required to change the data transmission protocol, and may perform data interaction directly via the serial bus 21.

It should be noted that the I3C master device 22 and the I3C slave devices 23 according to the present application refer to a master device and slave devices that perform data interaction by using an I3C protocol, and the SMBUS master device 24 and the SMBUS slave devices 25 refer to a master device and slave devices that perform data interaction by using an SMBUS protocol. When the master device of the serial bus 21 is one of the I3C slave devices 23, not only the I3C master device 22 may perform data interaction with the I3C slave devices 23, but also the I3C slave devices 23 may perform data interaction therebetween. Likewise, the SMBUS master device 24 and the SMBUS slave devices 25 may perform data interaction therebetween, and the SMBUS slave devices 25 may perform data interaction therebetween.

The controlling module 12 may be but is not limited to a CPLD (Complex Programmable Logic Device). Not only the CPLD may complete various algorithms and combinatorial logics, but also its time-sequence delay is even and predicable. It may expand to a plurality of logic devices at the same time; in other words, it may control a plurality of analogue switches 11, to ensure that the user may add more I3C slave devices 23 or more SMBUS slave devices 25 to the serial bus 21.

In addition, in some embodiments of the present application, the controlling module 12 is further configured for collecting the data information of the serial bus 21, and determining the master-device type of the serial bus 21, where the master-device type of the serial bus 21 includes the I3C master device 22 and the SMBUS master device 24. The controlling module 12, when the current master device of the serial bus 21 being the I3C master device 22 is determined, turns on the analogue switches 11 corresponding to the I3C slave devices 23 that are selected by the user, and, when the current master device of the serial bus 21 being the SMBUS master device 24 is determined, turns on the analogue switches 11 corresponding to the SMBUS slave devices 25 that are selected by the user, to realize the switching between the data interaction among the I3C master device 22 and the I3C slave devices 23 and the data interaction among the SMBUS master device 24 and the SMBUS slave devices 25.

It should also be noted that the EN terminals of the analogue switches 11 in FIG. 1 are the enabling terminals of the analogue switches 11, and the controlling module realizes controlling the analogue switches 11 to be switched on and switched off by controlling the EN terminals of the analogue switches 11.

In conclusion, the serial bus according to the present application is compatible with the I3C bus and SMBUS, which ensures the demands on data transmission of multiple types of devices.

Figure 2:
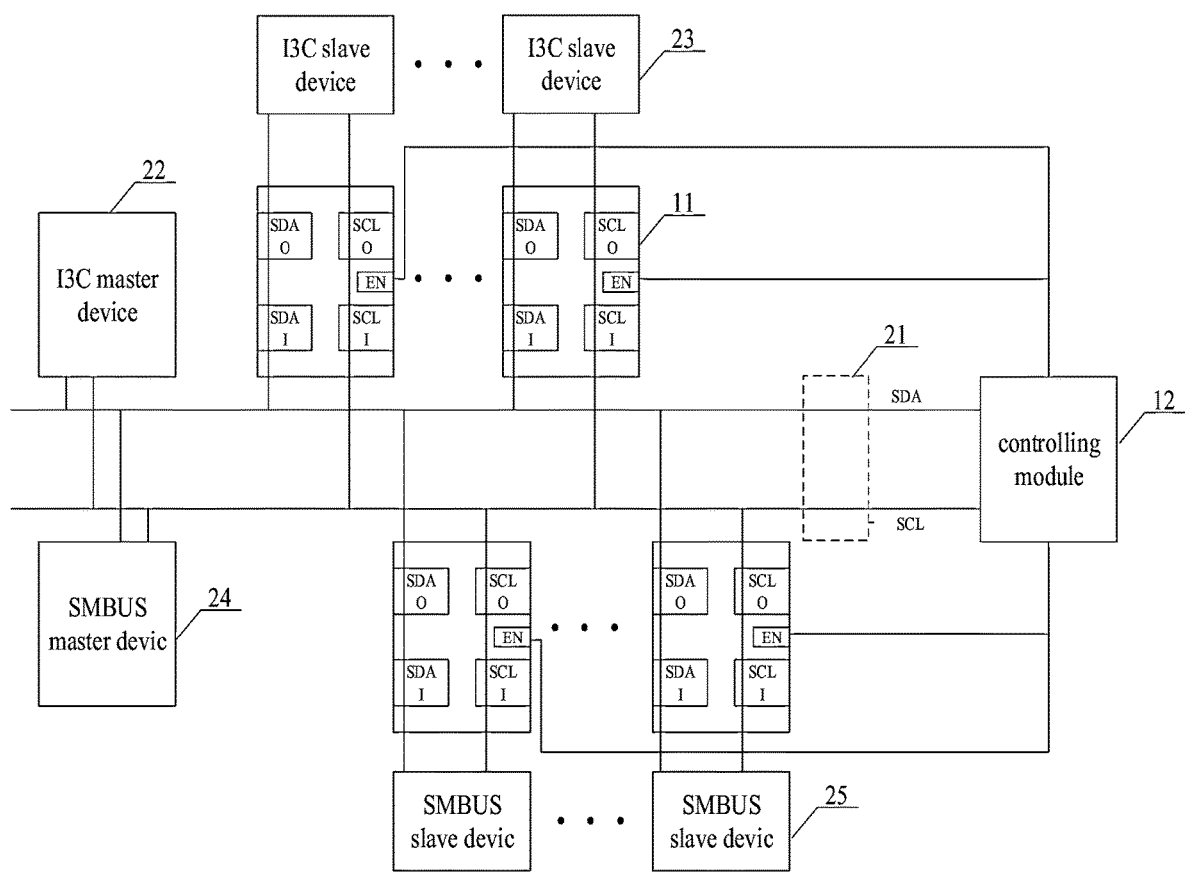
FIG. 2 is a particular schematic structural diagram of a controlling circuit for communication-link switching according to some embodiments of the present application.

On the basis of the above embodiments:

Referring to FIG. 2. FIG. 2 is a particular schematic structural diagram of a controlling circuit for communication-link switching according to some embodiments of the present application.

In some embodiments of the present application, the serial bus 21 includes a serial data line SDA and a serial clock line SCL.

The serial data line SDA is configured for transmitting serial data when the I3C master device 22 and the I3C slave devices 23 that are selected by the user are communicating, or transmitting serial data when the SMBUS master device 24 and the SMBUS slave devices 25 that are selected by the user are communicating.

The serial clock line SCL is configured for transmitting a clock signal sent by the I3C master device 22 to the I3C slave devices 23 that are selected by users, or transmitting a clock signal sent by the SMBUS master device 24 to the SMBUS slave devices 25 that are selected by users.

The serial bus 21 according to the present application includes a serial data line SDA and a serial clock line SCL, the serial data line SDA is configured for transmitting serial data, and the serial clock line SCL is configured for transmitting clock signals. Furthermore, the serial data transmitted by the serial data line SDA may be the serial data sent by the master devices or the slave devices, while the clock signals transmitted by the serial clock line SCL are merely the clock signals outputted by the master devices. In other words, the I3C master device 22 or the 20) SMBUS master device 24 transmits the clock signals to the I3C slave devices 23 or the SMBUS slave devices 25, to cause the I3C master device 22 and the I3C slave devices 23 to perform data interaction, or to cause the SMBUS master device 24 and the SMBUS slave devices 25 to perform data interaction.

It should be noted that the SDA I and the SCL I in FIG. 2 represent the terminal of the analogue switch 11 that is connected to the serial data line SDA, and the SDA O and the SCL O represent the terminal of the analogue switch 11 that is connected to the I3C slave device or the SMBUS slave device, among them, the SCL I represents the clock input, and the SCL O represents the clock output. However, the I3C slave devices and the SMBUS slave devices may perform bidirectional transmission of the serial data by using the analogue switches 11, and therefore the transmission directions of the serial data of the analogue switches 11 are not limited.

In some embodiments of the present application, the I3C slave devices 23 are further configured for, based on the setting by the user, as a temporary I3C master device, sending a clock signal to the serial clock line SCL.

The I3C master device 22 is further configured for, when the user sets the temporary I3C master device, as a temporary I3C slave device, performing data interaction of the serial data via the serial data line SDA with the temporary I3C master device and the I3C slave devices 23 that are selected by the user, and receiving the clock signal sent by the temporary I3C master device via the serial clock line SCL.

In the present embodiment, the I3C slave devices 23 may also serve as the master device; in other words, the I3C master device 22 and each of the I3C slave devices 23 may be set to be the master device by the user. Moreover, there may be merely one master device at the same time. In other words, when one of the I3C slave devices 23 is set to be the master device, it serves as a temporary I3C master device, and the I3C master device 22 serves as a temporary I3C slave device, in which case the temporary I3C master device sends the clock signals to the I3C slave devices 23 and the temporary I3C slave device via the serial clock line SCL, to cause the temporary I3C master device, the temporary I3C slave device and the I3C slave devices 23 to perform data interaction.

It can be seen that, in the present application, the user may set the current I3C master device 22 according to the demand of himself, in order to satisfy multiple types of demands of the user.

In some embodiments of the present application, the SMBUS master device 24 and the SMBUS slave devices 25 are connected by an interrupted-communication line.

The SMBUS master device 24 is further configured for, when an interruption prompting message sent by the SMBUS slave devices 25 via the interrupted-communication line is received, processing the interruption prompting message.

In the present embodiment, the SMBUS slave devices 25, when intend to send the interruption prompting message to the SMBUS master device 24, may transmit the interruption prompting message via the additionally provided interrupted-communication line, so that the SMBUS master device 24 processes the interruption prompting message timely after the interruption prompting message is received, to ensure the normal operation of the SMBUS master device 24 and the SMBUS slave devices.

In some embodiments of the present application, the I3C master device 22 is further configured for, when an interruption prompting message sent by the I3C slave devices 23 via the serial bus 21 is received, performing soft interruption processing to the interruption prompting message.

In the present embodiment, the I3C master device 22 and the I3C slave devices 23 do not require to be provided with an interrupted-communication connecting line therebetween, and the interruption prompting message may be transmitted directly via the serial bus 21, to reduce the hardware cost on additionally providing the interruption connecting line. Furthermore, the I3C master device 22 may perform soft interruption processing to the interruption prompting message after the interruption prompting message is received. In other words, it does not preferentially process the interruption prompting message, but invokes an interrupting module, and processing the interruption prompting message with delay, to preferentially ensure the performance of the current operation of itself, so as to prevent delay and incapability of normal completion of the current operation caused by the processing of the interruption prompting message.

The present application further provides a communication link, the communication link includes the controlling circuit for communication-link switching stated above.

In some embodiments of the present application, the communication link further includes a serial bus 21, an I3C master device 22, a plurality of I3C slave devices 23, an SMBUS master device 24 and a plurality of SMBUS slave devices 25.

The description on the communication link according to some embodiments of the present application may refer to the above embodiments, and is not discussed further in the present application.

The server according to the present application includes the communication link stated above.

In addition, the I3C slave devices 22 and the analogue switches 11 may be connected via an I3C HUB, and the SMBUS slave devices 25 and the analogue switches 11 may be connected via an SMBUS MUX.

The description on the server according to some embodiments of the present application may refer to the above embodiments, and is not discussed further in the present application.

It should also be noted that, in the description, relation terms such as first and second are merely intended to distinguish one entity or operation from another entity or operation, and that does not necessarily require or imply that those entities or operations have therebetween any such actual relation or order. Furthermore, the terms "include", "comprise" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording "comprising a . . . " does not exclude additional same element in the process, method, article or device comprising the element.

The above description on the disclosed embodiments enables a person skilled in the art to implement or use the present application. Various modifications on those embodiments will be apparent to a person skilled in the art, and the general principle defined herein may be implemented in other embodiments without departing from the spirit or scope of the present application. Therefore, the present application should not be limited to the embodiments illustrated herein, but should meet the broadest scope in accord with the principle and the novel characteristics disclosed herein.

The invention claimed is:

1. A controlling circuit for communication-link switching, wherein the controlling circuit is applied to a communication link, and the communication link comprises a serial bus, an improved inter integrated circuit (I3C) master device, a plurality of I3C slave devices, a system management bus (SMBUS) master device and a plurality of SMBUS slave devices; and the controlling circuit comprises:
a plurality of analogue switches that are provided in the serial bus and are connected to the I3C slave devices and the SMBUS slave devices correspondingly one to one; and
a controlling module having an input terminal connected to the serial bus and an output terminal connected to the analogue switches, wherein the controlling module is configured for, when a master device of the serial bus is the I3C master device, controlling the analogue switches corresponding to I3C slave devices that are selected by a user to be switched on, so that the I3C master device and the I3C slave devices that are selected by the user perform data interaction via the serial bus; and when the master device of the serial bus is the SMBUS master device, controlling the analogue switches corresponding to SMBUS slave devices that are selected by the user to be switched on, so that the SMBUS master device and the SMBUS slave devices that are selected by the user perform data interaction via the serial bus;
wherein the controlling module is configured for, when the master device of the serial bus is one of the I3C slave devices, performing data interaction between the I3C slave devices; and, the controlling module is configured for, when the master device of the serial bus is one of the SMBUS slave devices, performing data interaction between the SMBUS slave devices; and
the controlling module is further configured for collecting data information of the serial bus, and determining a master-device type of the serial bus, wherein the master-device type of the serial bus comprises the I3C master device and the SMBUS master device.

2. The controlling circuit for communication-link switching according to claim 1, wherein the serial bus comprises a serial data line and a serial clock line;
the serial data line is configured for transmitting serial data when the I3C master device and the I3C slave devices that are selected by the user are communicating, or transmitting serial data when the SMBUS master device and the SMBUS slave devices that are selected by the user are communicating; and
the serial clock line is configured for transmitting a clock signal sent by the I3C master device to the I3C slave devices that are selected by users, or transmitting a clock signal sent by the SMBUS master device to the SMBUS slave devices that are selected by users.

3. The controlling circuit for communication-link switching according to claim 2, wherein the I3C slave devices are further configured for, based on setting by the user, as a temporary I3C master device, sending a clock signal to the serial clock line; and
the I3C master device is further configured for, when the user sets the temporary I3C master device, as a temporary I3C slave device, performing data interaction of the serial data via the serial data line with the temporary I3C master device and the I3C slave devices that are selected by the user, and receiving the clock signal sent by the temporary I3C master device via the serial clock line.

4. The controlling circuit for communication-link switching according to claim 1, wherein the controlling module is a complex programmable logic device (CPLD).

5. The controlling circuit for communication-link switching according to claim 1, wherein the SMBUS master device and the SMBUS slave devices are connected by an interrupted-communication line; and
the SMBUS master device is further configured for, when an interruption prompting message sent by the SMBUS slave devices via the interrupted-communication line is received, processing the interruption prompting message.

6. The controlling circuit for communication-link switching according to claim 1, wherein the I3C master device is further configured for, when an interruption prompting message sent by the I3C slave devices via the serial bus is received, performing soft interruption processing on the interruption prompting message.

7. The controlling circuit for communication-link switching according to claim 6, wherein the soft interruption processing comprises invoking an interrupting module, and processing the interruption prompting message with delay.

8. The controlling circuit for communication-link switching according to claim 1, wherein the I3C master device and the I3C slave devices are a master device and slave devices that perform data interaction by using an I3C protocol.

9. The controlling circuit for communication-link switching according to claim 8, wherein the I3C protocol ensures that a data transmission speed reaches 12.5 M.

10. The controlling circuit for communication-link switching according to claim 1, wherein the SMBUS master device and the SMBUS slave devices are a master device and slave devices that perform data interaction by using an SMBUS protocol.

11. The controlling circuit for communication-link switching according to claim 1, wherein the controlling module controls the analogue switches to be switched on and switched off by using EN (enabling) terminals of the analogue switches.

12. The controlling circuit for communication-link switching according to claim 1, wherein the I3C slave devices and the SMBUS slave devices perform bidirectional transmission of serial data by using the analogue switches.

13. The controlling circuit for communication-link switching according to claim 1, wherein a data transmission speed of an I3C protocol is greater than a data transmission speed of an SMBUS protocol.

14. The controlling circuit for communication-link switching according to claim 1, wherein the I3C slave devices and the analogue switches are connected via an I3C HUB.

15. The controlling circuit for communication-link switching according to claim 1, wherein the SMBUS slave device and the analogue switches are connected via an SMBUS MUX.

16. A communication link, wherein the communication link comprises the controlling circuit for communication-link switching according to claim 1.

17. A server, wherein the server comprises the communication link according to claim 16.

* * * * *